July 17, 1962

A. BERENBAUM 3,044,181

HEATER CONTROL IN LAUNDRY APPARATUS

Filed Oct. 20, 1958

INVENTOR.
ARTHUR BERENBAUM
BY

Carl H. Synnestvedt

AGENT

July 17, 1962

A. BERENBAUM 3,044,181

HEATER CONTROL IN LAUNDRY APPARATUS

Filed Oct. 20, 1958

INVENTOR.
ARTHUR BERENBAUM
BY
Carl H. Synnestvedt
AGENT

United States Patent Office 3,044,181
Patented July 17, 1962

3,044,181
HEATER CONTROL IN LAUNDRY APPARATUS
Arthur Berenbaum, Philadelphia, Pa., assignor, by mesne assignments, to Philco Corporation, Philadelphia, Pa., a corporation of Delaware
Filed Oct. 20, 1958, Ser. No. 768,101
4 Claims. (Cl. 34—45)

The present invention relates to drying apparatus and more particularly to apparatus for drying fabrics, or the like. While of broader applicability, the invention has particular utility in laundry drying apparatus.

One known form of such apparatus embodies perforate container means, for wet clothes, said container means being mounted within an enclosure and including means for heating ambient air and circulating the same through the container means. In order to maintain the temperature of the air within the container means within predetermined safe limits as respects the clothes being dried, suitable thermostatic control means are provided in combination with the means for heating. In the initial stages of drying, when the moisture content of the clothes is relatively high, substantially constant drying temperatures, within safe limits, can readily be maintained, due to transfer of the latent heat of vaporization. Consequently, thermostatic control presents no problem during this initial period of latent-heat transfer. However, as the moisture retention of the clothes decreases the temperature thereof tends to rise, due to greater sensible heat transfer, and thermostatic control must be initiated to maintain clothes temperatures within predetermined safe limits. In brief, it has been found advantageous to control the heat in such manner that relatively intense heat is applied while the clothes are wet, followed by lesser heat input as the moisture content of the clothes decreases.

It is an object of this invention, therefore, to provide simple and effective means for controlling drying apparatus in accordance with the foregoing principles.

It is another object of the invention to provide, in clothes drying apparatus, novel control means minimizing the length of time required for drying clothes.

A still further object of the invention is to provide, for use in an automatic clothes dryer, a novel arrangement of thermostatic elements for controlling the heat source.

It is a specific object of the invention to provide, in electrically energized drying equipment a novel electrical arrangement of thermostatic elements for controlling an electrical heat source.

In achievement of the foregoing as well as other objectives, a preferred embodiment of the invention comprises, in apparatus for drying articles by application of heated air to the same, means for heating the air and thermostatic means responsive to the temperature of the air for controlling operation of the means for heating, including first and second thermostatic elements arranged to provide predetermined upper and lower air temperature limits. The upper limit provided by said second element is below the upper limit of the first element and the lower limit provided by the said second element is above the lower limit provided by the first element, the construction and arrangement being such that said first element provides initial deenergization of the means for heating, in response to the air temperature, and said second element, alone, subsequently energizes and deenergizes, cyclically, the means for heating in response to the air temperature.

It is further contemplated that, in a modified embodiment of the invention, the heating means include a higher and a lower wattage heat source, each being alternately energizable by cyclic operation of the second thermostatic element.

For a more complete understanding of the invention, and the manner in which principles thereof may best be carried out, reference may be had to the accompanying drawing, in which.

Figure 1:
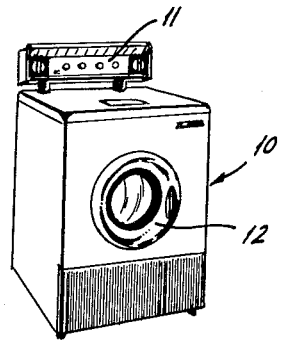
FIGURE 1 is a perspective showing of laundry apparatus embodying the invention.
Figure 2:
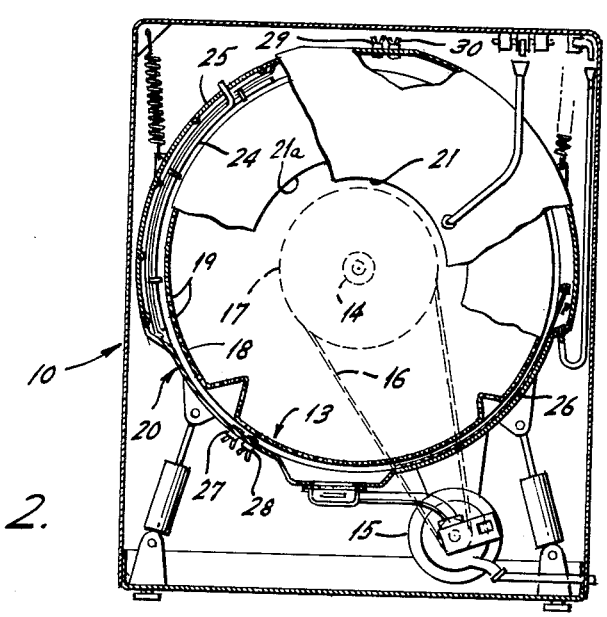
FIGURE 2 is a sectional showing of apparatus seen in FIGURE 1.

Now referring in more detail to the drawing, and first to FIGURES 1 and 2 thereof, the invention is depicted for exemplary purposes as being embodied in laundry apparatus of the type disclosed and claimed in the copending application of Ernest G. Orr, Serial No. 740,103, filed June 5, 1958, and assigned to the assignee of the present invention. It should be understood that while the aforementioned apparatus embodies, in a single unit, a washing machine and a dryer, the present invention is equally as well adapted for use in separately contained dryer units.

The aforementioned apparatus comprises cabinet structure 10 having mounted thereon control means 11 and a door 12 that provides access to an opening 21 communicating with the interior of a clothes drying chamber mounted within the said cabinet structure. The clothes drying chamber comprises a horizontally extending perforate drum or cylindrical basket 13 (FIGURE 2) which is mounted for rotating movements about a horizontally extending hub 14. Drive means for rotating the drum includes a motor 15 arranged to drive a belt 16, the latter engaging a pulley 17 mounted to the drum in the region of said hub 14.

As is well known in the art, in either the washing or the drying operation, drum 13 is rotated in order to tumble the clothes, and particularly during the drying operation uniformly to expose the fabrics or clothes being dried to circulating heated air, thereby facilitating the drying operation.

As is seen further in FIGURE 2, while the ends of drum 13 are preferably imperforate, with the exception of the loading opening 21a, the cylindrical surface portion 18 of the drum has perforations 19 to permit passage of heated circulating air through the drum to dry clothes disposed therein. An imperforate enclosure or housing 20 is spaced from and encloses the drum, and an electrical resistance heater 24 is carried by an inwardly presented recessed portion 25 of drum enclosure 20. Means for cooling the circulated air includes a water-vapor condenser 26 disposed adjacent enclosure 20, and opposite the heater 24. Circulation of the air is effected due to rotation of the drum in combination with temperature gradients existing between the relatively warm heater 24 and cool condenser 26.

Means for sensing the temperature within the clothes drying chamber includes a pair of thermostats or thermostatic elements 27 and 28 disposed preferably in a lower portion of the imperforate drum enclosure, and an additional pair of like elements 29 and 30 disposed similarly in an upper portion of the drum enclosure. The aforesaid thermostatic elements are thereby disposed in heat exchange relation with the circulating air. Preferably each element is of the type having a bimetal disc which serves as a combined sensing element and circuit modifier in a manner to be hereinafter described in detail.

Figure 3:
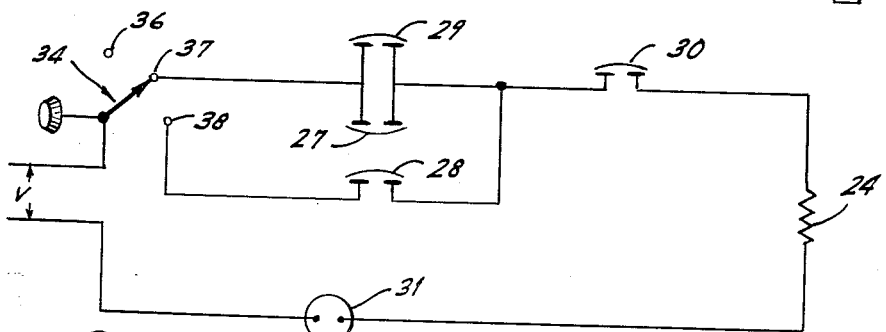
FIGURE 3 is a schematic showing of electrical control circuitry embodying the invention.

In particular accordance with the invention, and referring further to FIGURE 3, the energizing circuit for the electrical resistance heater 24 includes a voltage supply V, and disposed in series circuitry with the aforesaid voltage supply and heater is timer means 31 for the heater and a manual selector switch 34, each forming a part of control means 11. Switch 34 is actuatable, selectively, to any of three positions 36, 37, or 38. Position 36 is a heater deenergizing or "air-fluff" position, position 37 is a high-heat or "super-fast" setting, and position 38 is a low-heat or "wash and wear" setting. The apparatus of the present invention, while not necessarily so limited, is preferably included in the circuit provided by moving the switch 34 to the position 37, as shown. This switch setting places parallelly disposed operating thermostatic elements 27 and 29 in series circuit with the heater. The switch, when actuated to position 38, is placed in series circuit with a single operating thermostatic element 28. A single, conventional safety thermostatic element 30 is disposed in series with either of the aforementioned circuits. It will be of course understood that additional control circuitry may be provided as is required to operate apparatus embodying the invention. Such additional circuitry is well known in the art and need not be described in detail.

In the drying operation of the apparatus, damp fabrics or clothes (not shown) remain disposed in the rotatable drum 13 following the water extracting operation of the latter. Assuming, then, that the manual selector switch of the drying apparatus has been placed in the position shown, the circuit which includes the parallelly disposed thermostatic elements 27 and 29, arranged in accordance with the invention, is placed in series with the heater 24, timer means 31, and the high limit safety thermostatic element 30. In a preferred embodiment of the invention, and by way of example only, the following relative temperature values were selected at which the said thermostatic elements operate to open and close their respective circuits:

|            | Opens, ° F. | Closes, ° F. |
|------------|-------------|--------------|
| Element 27 | 160         | 140          |
| Element 29 | 215         | 125          |
| Element 30 | 220         | 200          |

It will be noted that the high limit safety thermostatic element 30 is arranged to open, to deenergize the heater, at a temperature value higher than that at which the operating thermostatic element 29 opens. It will be further noted that the operating thermostatic element 29 closes at a temperature substantially below the temperature at which the operating thermostatic element 27 closes, thereby preventing, in a given drying period as determined by timer 31, thermostatic element 29 from resetting by closing, as will be hereinafter more fully explained.

Figure 5:
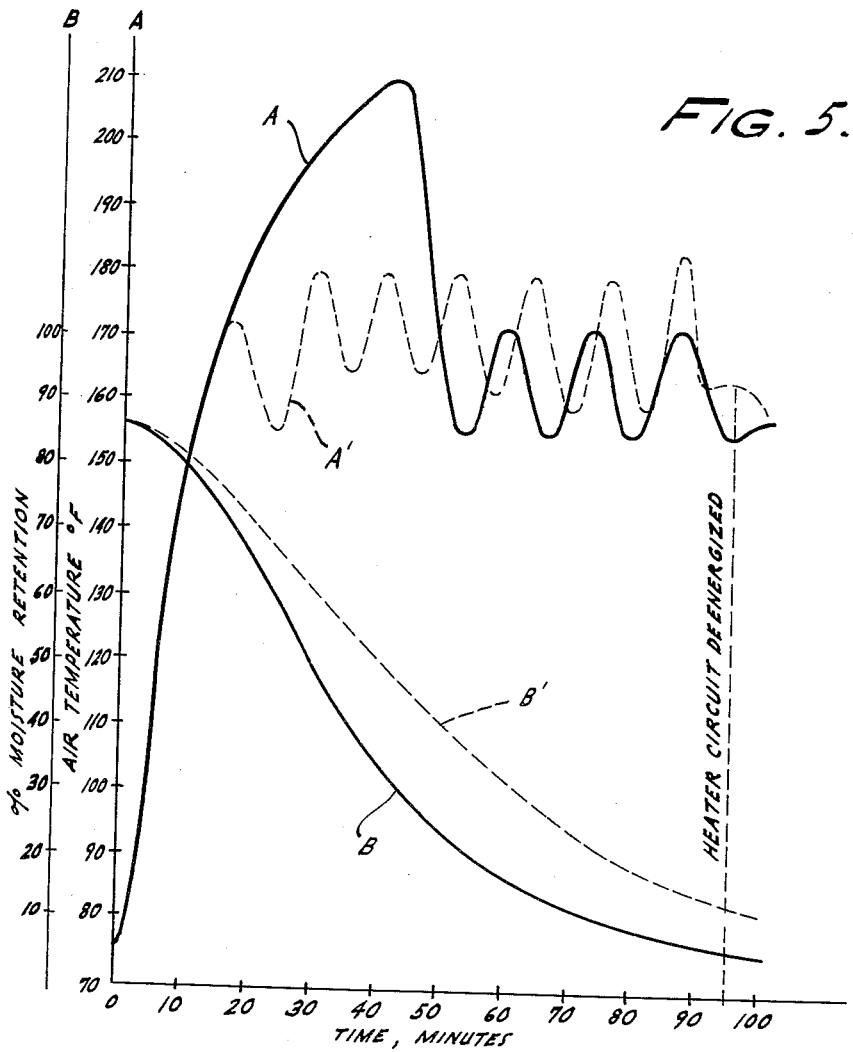
FIGURE 5 is a graphic representation of performance characteristics of apparatus embodying the present invention, as compared with characteristics of apparatus embodying the prior art electrical circuitry shown in FIGURE 4.

By virtue of the foregoing novel arrangement, and with reference also to FIGURE 5, while both thermostatic elements 27 and 29 will provide for energization of the heater, either together or individually, thermostatic element 29 will remain closed and permit the heater initially to remain energized and raise the temperature of the air to a value considerably in excess of that temperature at which thermostatic element 27 opens. An initial representative air temperature rise within drum 13, following energization of heater 24, is indicated by the relatively steep left-hand portion of temperature-time curve A of FIGURE 5. As the air temperature within the drum rises, the cut-out or opening temperature (160° F.) of thermostatic element 27 exposed to this air is attained, and its contacts open. However, heater 24 remains energized due to the still-closed thermostatic element 29. This element remains closed until such time as continued heating of the air raises its temperature to 215° F., at which time, and as indicated by the initial peak of curve A, the contacts open to deenergize the heater. Deenergization of the heater permits the air temperature to decrease until such time as the cut-in or closing temperature (140° F.) of the thermostatic element 27 is reached and the heater is again energized. It is important to note, however, that due to the relative values of the cut-in, or closing, temperatures of the thermostatic elements 27 (140° F.) and 29 (125° F.), no energization of the heater element can be again effected by thermostatic element 29, in a given drying period. Consequently, the heater element 24 will continue to cycle in response to opening and closing of the contacts of thermostatic element 27, and until such time as satisfactory drying of the clothes, as determined by the timer means 31, is accomplished. This latter cycling is represented by the undulating, right-hand portion of the curve A.

Curve B represents the percentage of moisture retention by the clothes being dried, the initial retention being somewhat less than 100% due to extraction of some moisture in the spin-dry cycle of the washing process.

Figure 4:
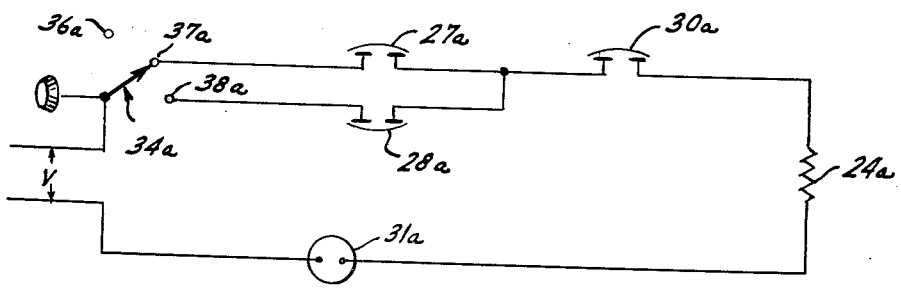
FIGURE 4 is a showing similar to FIGURE 3, but illustrating circuitry heretofore known in the art.

In order better to understand the advantages provided by the present invention, reference may be had to FIGURE 4, and again to FIGURE 5. Apparatus of the prior art is shown in FIGURE 4, for purposes of comparison, the operating characteristics of such apparatus being indicated by curves A' and B' of FIGURE 5. As seen in FIGURE 4, prior circuitry included switch means 34a selectively operable to any of positions 36a, 37a, and 38a, and in a manner similar to the apparatus of the present invention. Positions 36a and 38a are of course comparable to settings 36 and 38, respectively, of FIGURE 3, and the drying period determined in a similar manner by timer means 31a. However, in the circuit completed by moving the switch 34a to position 37a, but a single thermostatic element 27a is provided for cycling the heater 24a. This element 27a is comparable, by way of example, to element 27 as respects opening and closing temperature values (160° F.–140° F.), whereas the safety-limit thermostatic 30a element in series with the former is comparable in its operating temperature values to element 29 (215° F.–125° F.) of the present invention.

Drying performance when using the circuit of FIGURE 4 is indicated in the broken line curves of FIGURE 5, and it will be noted that while the initial warm-up or left-hand portion of the curve A' follows closely curve A, the curve A' initially peaks earlier and at a far lower temperature than does curve A. This of course is due to the relatively low cut-out temperature value of the thermostatic element 27a, which is the sole cycle producing means for the heater element in the illustrated position of switch 34a. This low value was of course required to prevent damage to the clothes during subsequent portions of the cycle when moisture retention is low. Subsequent cycling of the heater element 24a is indicated by the right-hand, undulating portion of curve A'.

It is important to note that the percent moisture retention curve B' has a lesser slope than the corresponding curve B representative of the present invention. By virtue of this relationship it can be shown that the prior art apparatus, in one timed drying period (95 minutes of cyclic heating plus 5 minutes of cooling, for example), effected a desired moisture retention value of 12%, whereas apparatus of the present invention, in a similar cyclic heating period, advantageously attained a moisture-retained value of 12% in about 73 minutes, representing a saving of 22 minutes.

As regards the modified embodiment shown in

Figure 6:
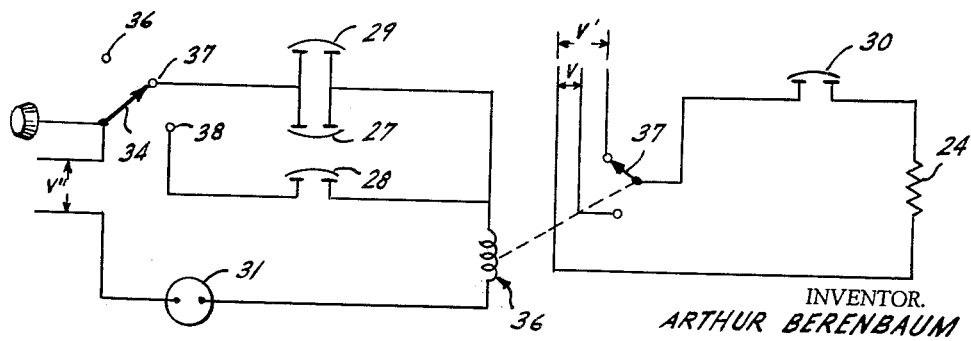
FIGURE 6 is a showing similar to FIGURE 3, and illustrating a modification of the invention.

FIGURE 6, it is contemplated that the heater element be energized alternately by respective high and low voltage sources V and V', and in response to actuation of either thermostatic elements 28 or 27, 29 in accordance with the energizing position of switch 34. One advantage of this arrangement is that it permits use of a relatively low signal voltage V'' sufficient to operate a suitable voltage relay 36 through the thermostatic elements, thereby minimizing shock hazard to a user of the apparatus while manipulating the controls. The relay includes by way of example a double-pole single-throw switch 37 that provides for energization of the heater, alternately, by the low and high voltage sources as indicated above. Incorporating a relay device as such not only enables use of a low voltage signal circuit, but also facilitates flexible heat control by providing for initiation and termination of various additional heater combinations. It will be understood of course that in the embodiment of FIGURE 6, the control exercised by timer means 31 as well as elements 27, 28, and 29 is, in end result, the same as that exercised by the corresponding control elements of the preferred embodiment earlier described.

It is seen therefore, that the present invention has provided simple and effective means for controlling clothes drying apparatus in such manner as materially to reduce the drying time heretofore required. It will be understood that such modifications may be made in the illustrated embodiments as are contemplated by the scope of the appended claims.

I claim:

1. In apparatus for drying fabrics, electrical heater means arranged for energization, selectively, by either a higher voltage or a lower voltage source, an electrical relay including an operating coil and switch means operative to either of a pair of positions by said coil in response to energization and deenergization of the latter, said switch means when moved to one position of said pair being disposed in series electrical circuitry with said lower voltage source and being disposed in like circuitry with said higher voltage source and said heater when moved to the other position of said pair; a source of electrical energy for said relay operating coil; and a pair of thermostats disposed in series circuit with said source of electrical energy and said coil, and in parallel circuitry with one another, each said thermostat having a predetermined cut-out temperature and a predetermined cut-in temperature, the cut-out temperature of one thermostat being below that of the other thermostat and the cut-in temperature of said one thermostat being above the cut-in temperature of said other thermostat.

2. In combination with apparatus for drying articles by applying heated air to the same, means for heating the air including an electrical heater adapted for energization, selectively, through either higher voltage or lower voltage circuits, to vary the temperature of the air, and means for effecting cyclic energization of said heater alternately by each of said circuits thereby to control the temperature of the air, said means for controlling comprising: switch means for connecting, selectively, said lower and higher voltage circuits to said means for heating, and means for operating said switch means operative in response to the temperature of the air and including first and second thermostatic elements, each said element being adapted to provide predetermined upper and lower air temperature limits, the upper limit provided by said second element being below the upper limit provided by said first element, the lower limit provided by said second element being above the lower limit provided by said first element, the construction and arrangement being such that initial energization of the heater is effected through said higher voltage circuit, following which said first element provides for deenergization of the heater by said higher voltage circuit and permits energization of the same by said second element, whereupon said latter element alone subsequently effects operation of the heater switch to provide, alternately, for lower and higher voltage operation of said heater.

3. In combination with apparatus for drying articles by applying heated air to the same, means for heating the air including an electrical heater arranged for energization, selectively, by either higher voltage or lower voltage sources, to vary the temperature of the air, and means for effecting such energization, cyclically, to control the temperature of the air, said means for controlling comprising: an electrical relay including an operating coil and switch means operative to either of a pair of positions by said coil in response to energization and deenergization of the latter, said switch means when moved to one position of said pair being disposed in series electrical circuitry with said lower voltage source and said heater to energize the latter and being disposed in like circuitry with said higher voltage source and said heater, to energize the latter, when moved to the other position of said pair; a source of electrical energy for said relay coil; and a pair of thermostatic elements disposed in series circuit with said source of energy and said relay coil and in parallel circuitry with one another, each said element having a predetermined cut-in and a predetermined cut-out temperature respectively to energize and deenergize said coil, the cut-out temperature of one element being below that of the other element and the cut-in temperature of said one element being above the cut-in temperature of said other element whereby initial energization of said heater is effected through said higher voltage source, following which said other thermostatic element provides for deenergization of the heater by said higher voltage source and permits energization of the same by said one thermostatic element, the said latter element subsequently effecting operation of the heater switch to provide, alternately, for lower and higher voltage operation of the heater.

4. In apparatus for drying fabrics, a source of relatively high energy and a source of relatively low energy, a heater element energizable, selectively, by said higher or lower energy sources to supply heat for drying either at a higher or at a lower rate, switching means operative, selectively, to provide for operation of said heater element either by said higher or said lower energy source, and a pair of thermostatic elements operatively connected with said switching means to operate the latter to effect heating at said higher and said lower rates, sequentially, in response to upper and lower temperatures within said apparatus, the upper and lower temperatures to which one said element is responsive being intermediate the upper and lower limits to which the other element is responsive, the said other thermostatic element being operative initially to provide for energization of said heater element by said higher energy source to effect its higher heat supply rate, the said one thermostatic element thereafter being operative, cyclically, to provide for energization of said heater element by said lower and said higher energy sources.

References Cited in the file of this patent

UNITED STATES PATENTS

| | | |
|---|---|---|
| Re. 14,286 | Mann | Apr. 17, 1917 |
| 2,046,718 | Bletz | July 7, 1936 |
| 2,332,639 | Hudson | Oct. 28, 1943 |
| 2,621,423 | Clark | Dec. 16, 1952 |
| 2,775,047 | Morrison | Dec. 25, 1956 |
| 2,819,540 | Toma et al. | Jan. 14, 1958 |
| 2,863,224 | Zehrbach | Dec. 9, 1958 |
| 2,869,247 | Metzger | Jan. 20, 1959 |